US010261958B1

(12) United States Patent
Kenthapadi et al.

(10) Patent No.: US 10,261,958 B1
(45) Date of Patent: Apr. 16, 2019

(54) GENERATING AN ASSOCIATION BETWEEN CONFIDENTIAL DATA AND MEMBER ATTRIBUTES

(71) Applicant: Microsoft Technology Licensing, LLC, Redmond, WA (US)

(72) Inventors: Krishnaram Kenthapadi, Sunnyvale, CA (US); Ahsan Chudhary, Sunnyvale, CA (US); Stephanie Chou, San Francisco, CA (US); Joseph Florencio, San Jose, CA (US); Anthony Duane Duerr, Castro Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 15/224,260

(22) Filed: Jul. 29, 2016

(51) Int. Cl.
*G06F 16/00* (2019.01)
*G06F 16/25* (2019.01)
*G06F 16/28* (2019.01)
*G06F 16/335* (2019.01)
*H04L 29/06* (2006.01)
*H04W 12/02* (2009.01)

(52) U.S. Cl.
CPC .......... *G06F 16/254* (2019.01); *G06F 16/285* (2019.01); *G06F 16/335* (2019.01); *H04L 63/104* (2013.01); *H04W 12/02* (2013.01)

(58) Field of Classification Search
CPC . H04L 63/102; H04L 67/306; H04L 63/0407; H04L 63/0421; H04L 63/0442; H04L 63/0471; H04W 12/02; G06F 21/31; G06F 21/6245; G06F 21/6254; G06F 16/285; G06F 16/335; G06F 16/35; G06F 16/435; G06F 16/535; G06F 16/75; G06F 16/906
See application file for complete search history.

(56) References Cited

U.S. PATENT DOCUMENTS

| | | | | |
|---|---|---|---|---|
| 8,069,053 | B2 * | 11/2011 | Gervais | G06Q 40/08 705/1.1 |
| 8,966,649 | B2 * | 2/2015 | Stack | G06Q 10/10 726/17 |
| 9,288,056 | B1 * | 3/2016 | Spagnola | H04L 63/0428 |
| 9,686,356 | B2 * | 6/2017 | Raduchel | H04L 67/1095 |
| 10,043,040 | B1 * | 8/2018 | Kenthapadi | G06F 21/64 |
| 10,157,291 | B1 * | 12/2018 | Kenthapadi | G06F 21/6245 |

(Continued)

*Primary Examiner* — Dennis Truong
(74) *Attorney, Agent, or Firm* — Schwegman Lundberg & Woessner, P.A.

(57) ABSTRACT

In an example embodiment, a submission of confidential data is received from a user. A first service is queried using an identification of the user to obtain a member profile corresponding to the user in a social networking service. One or more primary attribute values are identified from the member profile. The one of the primary attribute values are used to query a second service to obtain a derived attribute value corresponding to the one or more primary attribute values. The confidential data, one or more of the primary attribute values, and the derived attribute value are stored in a first submission table in a confidential information database. Then the one or more of the primary attribute values and the derived attribute value are used to classify the user into one or more slices.

20 Claims, 17 Drawing Sheets

(56) References Cited

U.S. PATENT DOCUMENTS

| | | | |
|---|---|---|---|
| 2005/0257148 A1* | 11/2005 | Goodman | G06F 17/243 715/226 |
| 2011/0145570 A1* | 6/2011 | Gressel | H04L 63/0421 713/159 |
| 2012/0117144 A1* | 5/2012 | Douillet | G06F 17/3089 709/203 |
| 2013/0086225 A1* | 4/2013 | Gay | G06Q 10/10 709/219 |
| 2015/0149765 A1* | 5/2015 | Pauliac | H04L 67/306 713/153 |
| 2016/0078358 A1* | 3/2016 | Baveja | G06F 21/316 706/52 |
| 2017/0193451 A1* | 7/2017 | Fang | G06Q 10/1053 |

* cited by examiner

| CONFIDENTIAL DATA 402 | MEMBER ID 404 | TIMESTAMP 406 | FIRST ATTRIBUTE 408 | SECOND ATTRIBUTE 410 |
|---|---|---|---|---|
| XXX | YYY | 5/31/16 04:15:15 | SAN FRANCISCO | SOFTWARE ENGINEER |
| XXX | YYY | 5/31/16 10:15:12 | LOS ANGELES | SOFTWARE ENGINEER |
| XXX | YYY | 6/1/16 01:12:12 | LOS ANGELES | PRODUCT MANAGER |
| XXX | YYY | 6/2/16 23:15:59 | DALLAS | VICE PRESIDENT, SALES |
| XXX | YYY | 6/3/16 05:43:12 | NEW YORK | HR BUSINESS PARTNER |

*FIG. 4*

Table 600:

| TRANSACTION ID 604 | CONFIDENTIAL DATA 606 |
|---|---|
| ZZZ | XXX |
| ZZZ | XXX |
| ZZZ | XXX |
| ZZZ | XXX |
| ZZZ | XXX |

Table 602:

| TRANSACTION ID 608 | MEMBER ID 610 | TIMESTAMP 612 | FIRST ATTRIBUTE 614 | SECOND ATTRIBUTE 616 |
|---|---|---|---|---|
| ZZZ | YYY | 5/31/16 04:15:15 | SAN FRANCISCO | SOFTWARE ENGINEER |
| ZZZ | YYY | 5/31/16 10:15:12 | LOS ANGELES | SOFTWARE ENGINEER |
| ZZZ | YYY | 6/1/16 01:12:12 | LOS ANGELES | PRODUCT MANAGER |
| ZZZ | YYY | 6/2/16 23:15:59 | DALLAS | VICE PRESIDENT, SALES |
| ZZZ | YYY | 6/3/16 05:43:12 | NEW YORK | HR BUSINESS PARTNER |

*FIG. 6*

GENERATING AN ASSOCIATION BETWEEN CONFIDENTIAL DATA AND MEMBER ATTRIBUTES

TECHNICAL FIELD

The present disclosure generally relates to computer technology for solving technical challenges in collection and maintenance of confidential data in a computer system. More specifically, the present disclosure relates to generating an association between confidential data and member attributes.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical-based analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and only used for specific purposes, and it can be difficult to convince members to provide such confidential information due to their concerns that these technical challenges may not be met. Additionally, it can be difficult to ensure accuracy and reliability of the confidential data.

BRIEF DESCRIPTION OF THE DRAWINGS

Some embodiments of the technology are illustrated, by way of example and not limitation, in the figures of the accompanying drawings.

FIG. 4 is a diagram illustrating an example of a submission table, in accordance with an example embodiment.

FIG. 6 is a diagram illustrating an example of a first submission table 600 and second submission table, in accordance with an example embodiment.

DETAILED DESCRIPTION

Overview

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submissions of the confidential information, and maintains and utilizes the confidential information in a secure manner while ensuring that the confidential information is accurate and reliable.

Figure 1:
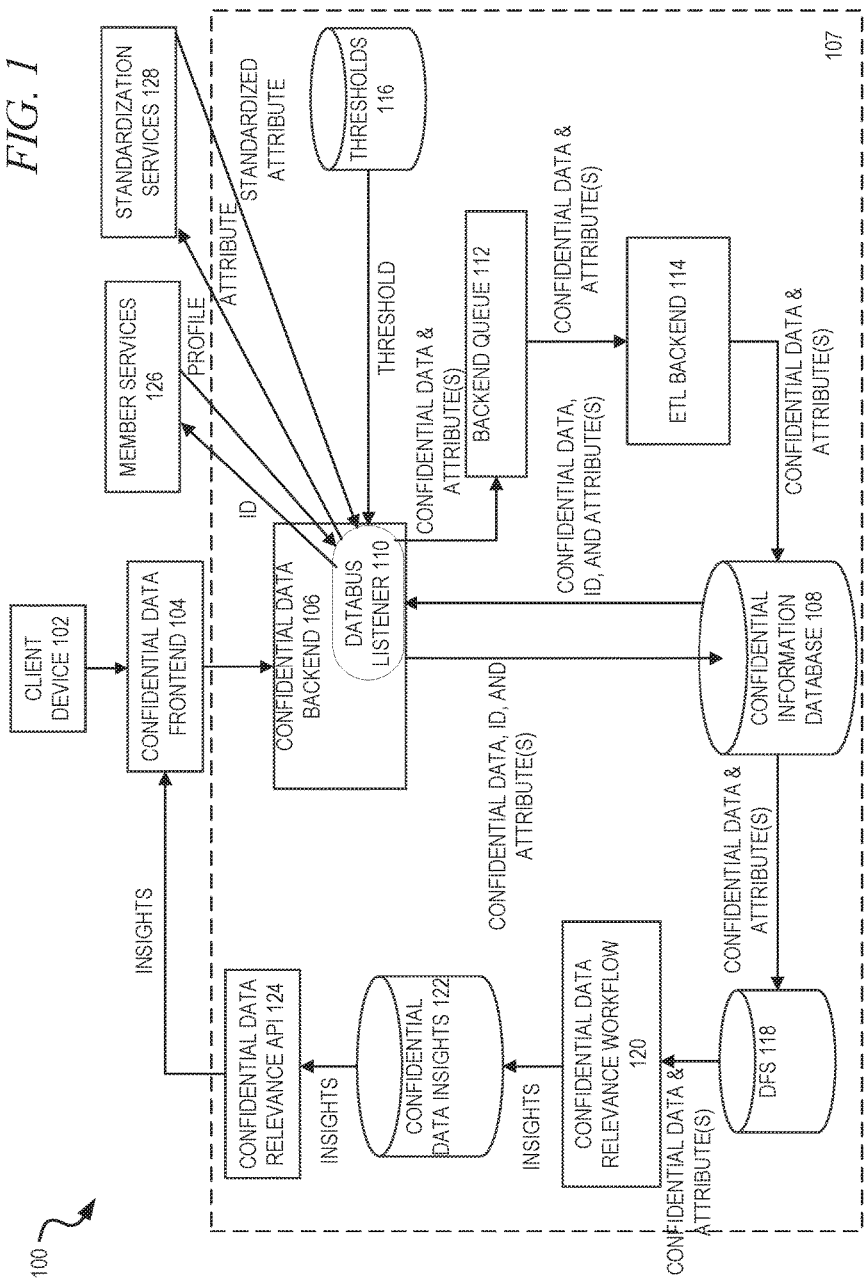
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to the confidential data backend 106. In some example embodiments, the confidential data backend 106 is located on a server-side or cloud platform 107 while the confidential data frontend 104 is directly connected or embedded in the client device 102. However, in some example embodiments, the client confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as Javascript code, in addition to Hypertext Markup Language (HTML) and Cascade Style Sheets (CSS) code designed to perform various tasks that will be described in more detail below. The web page may be served in response to the user selecting a link in a previous communication or web page. For example, the link may be displayed in an email communication to the user, or as part of a feed section of a user's social networking service member page. This allows the entity operating the system 100 to selectively target users to request that they submit confidential information. For example, the entity may determine there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a stand-alone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. Due to the reluctance of users to provide certain types of confidential data, in an example embodiment, insights from the confidential data contributed by other users are withheld from a user until the user contributes his or her own confidential data. As will be described in more detail, a mechanism to ensure that the contribution of confidential data is tracked is provided.

Once received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in the confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the compensation data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has not previously submitted confidential data or has not submitted confidential data within some predetermined time period (e.g., within the last year), then the confidential data backend 106 may indicate to the confidential data frontend 104 that it should not share insights from confidential data from other users with this particular user until this particular user submits confidential data (or submits updated confidential data in the case where the particular user had submitted confidential data previously).

There may be other methods for determining eligibility of a user for receiving insights from submissions from other users than those described above. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member) to transactional attributes (e.g., purchased a premium subscription).

Additionally, any combination of the above factors can be used to determine whether the user is eligible for receiving insights from submissions from other users.

As will be described in more detail below, in an example embodiment, a machine learning algorithm may be used to determine when a user is eligible to receive insights from confidential data submissions from other users. Specifically, the machine learning algorithm may be used to train an engagement model that uses one or more of the various factors described above as features to generate an engagement score for a particular user. This engagement score may be a representation of the likelihood that a user who is provided with insights from confidential data submissions from other users will engage more with a social networking service, either with or without the user having submitted his or her own confidential data. The engagement score may then be compared with a threshold to determine whether the user should be provided with the insights from confidential data submissions from other users. Alternatively, or in conjunction with this, the engagement score may then also be used to determine users from which to solicit confidential data.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational level, and the like. It should be noted that it is not necessary for these attributes to be stored in the submission table. Since an identification of the user is available in the submission table, it may be possible to retrieve the attributes for the user on an as needed basis, such as by querying a social networking service with the user identification when needed.

A databus listener 110 then detects when new confidential data is added to the confidential information database 108 and triggers a workflow to handle the new confidential data. First, it queries a thresholds data store 116 to determine if one or more thresholds for anonymization have been met. Specifically, until a certain number of data points for confidential data have been met, the system 100 will not act upon any particular confidential data point. As will be described in more detail later, these thresholds may be created on a per-slice basis. Each slice may define a segment of users upon which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least 10 data points (e.g., compensation information of 10 different users) are needed. In this case, the threshold for "software engineer" located in "San Francisco Bay Area" may be set at 10. The databus listener 110 therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be transgressed, and, if so, or if the threshold had already been exceeded, insert the data in a backend queue 112 for extract, transform, and load (ETL) functions.

In an example embodiment, the thresholds data store 116 contains not just the thresholds themselves but also maintains a running count of how many data points have been received for each slice. In other words, the thresholds data store 116 indicates how close the slice is to having enough data points with which to provide insights. The databus listener 110 may reference these counts when making its determination that a newly submitted data point causes a threshold to be transgressed. Running counts of data points received for each slice are updated in thresholds 116 by confidential data backend 106.

Since the databus listener 110 only transfers data points for a particular slice to the backend queue 112 once the threshold for that slice has been transgressed, the confidential data points corresponding to that slice may need to be retrieved from the confidential information database 108 once the threshold is determined to be transgressed. For example, if, as above, the threshold for a particular slice is 10 data points, the first 9 data points received for that slice may simply be left in the confidential information database 108 and not sent to the backend queue 112. Then, when the 10th data point for the slice is stored in the confidential information database 108, the databus listener 110 may determine that the threshold has been transgressed and retrieve all 10 data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes are transferred to the backend queue 112. This further helps to anonymize the data, as it makes it more difficult for people to be able to deduce the identity of a user based on his or her attributes.

It should also be noted that any one piece of confidential data may correspond to multiple different slices and thus the databus listener 110 may, in some example embodiments, provide the same confidential data to the backend queue 112 multiple times. This can occur at different times as well, because each of the slices may have their own threshold that may be transgressed at different times based on different counts. Thus, for example, compensation data for a user in the San Francisco Bay Area with a job title of "software developer" and a school attended as "Stanford University" may be appropriately assigned to one slice of software developers in the San Francisco Bay area, a slice of "Stanford University" alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location than it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and description of the confidential data will be discussed in more detail below.

The ETL backend 114 writes the anonymized confidential data and slice information into an ETL table corresponding to the slice in the confidential information database 108. As described earlier, this ETL table may be stored in a different location than the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS and provide one or more insights on the relevant information in a confidential data insights data store 122. A confidential data relevance API 124 may then be utilized to provide insights from the confidential data insights data store 122 to the confidential data frontend 104, which can then display it to a user. As described earlier, these insights may be provided only on a "give-to-get" basis, namely that only users who provide confidential information (and/or provide it recently) can view insights. More generally, the machine learned score described earlier can be used to determine eligibility of a user to be shown the insights.

Figure 2A:
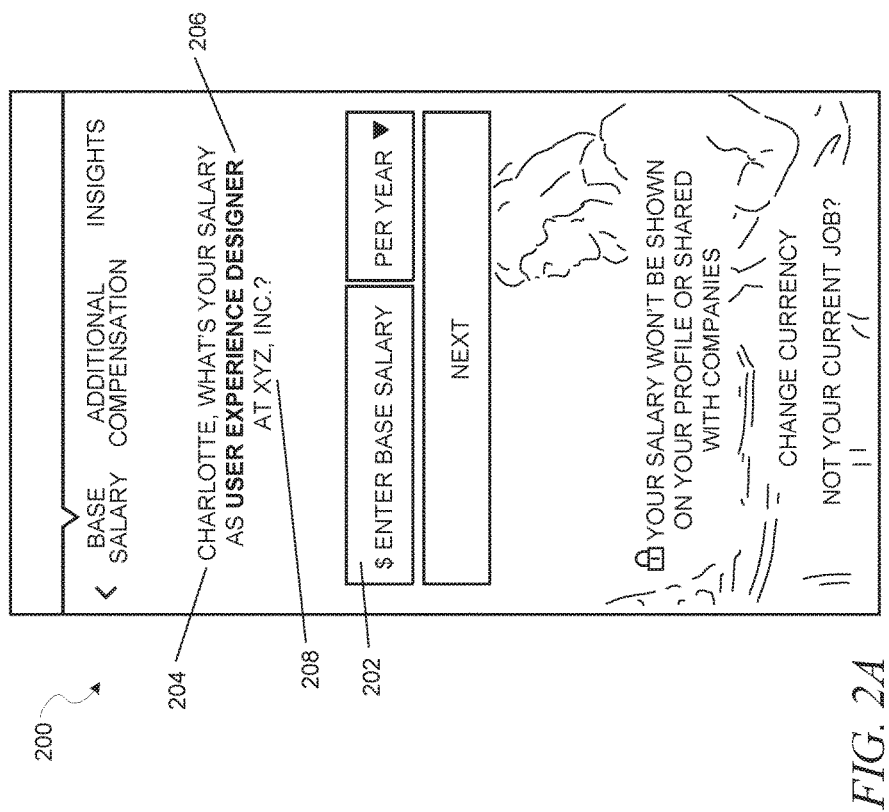
FIGS. 2A-2C are screen captures illustrating an example of a user interface provided by the confidential data frontend, in accordance with an example embodiment.
Figure 2B:
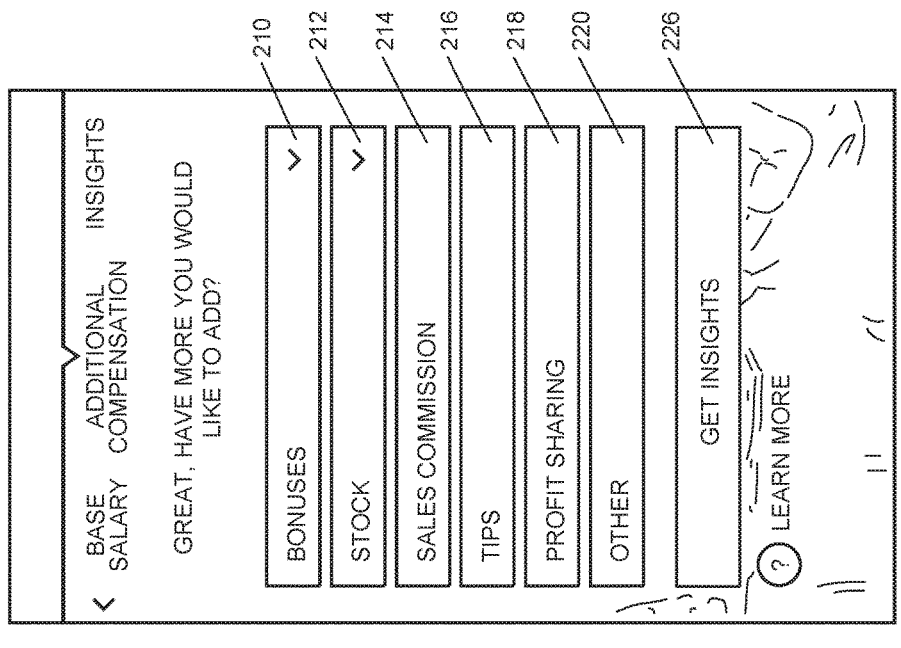
Figure 2C:
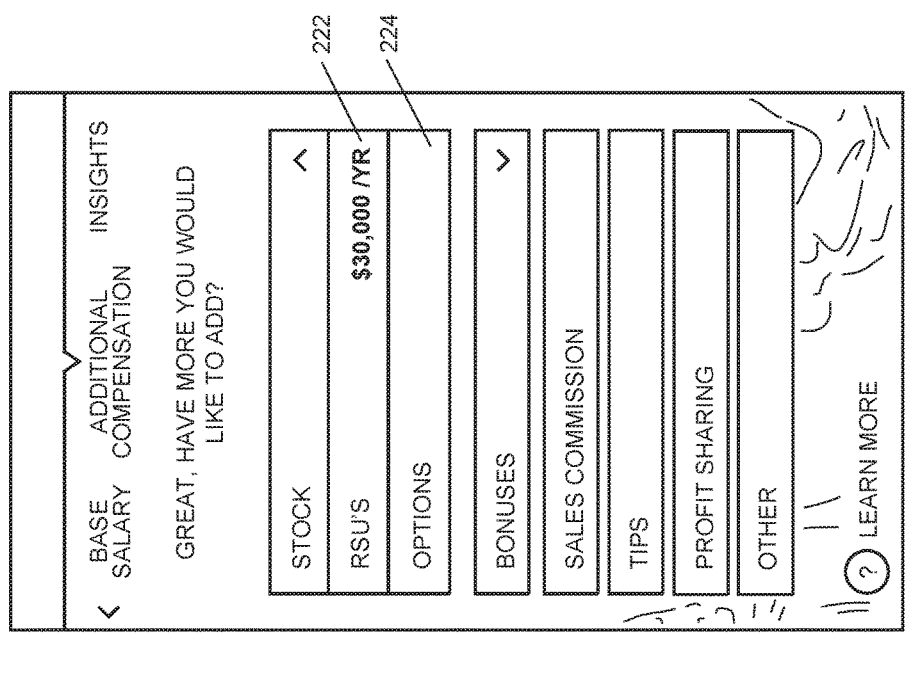

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a stand-alone application operating on a mobile device, such as a smartphone. In FIG. 2A, the user is prompted to enter a base salary in text box 202, with a drop down menu 204 providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or by completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from compensation data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
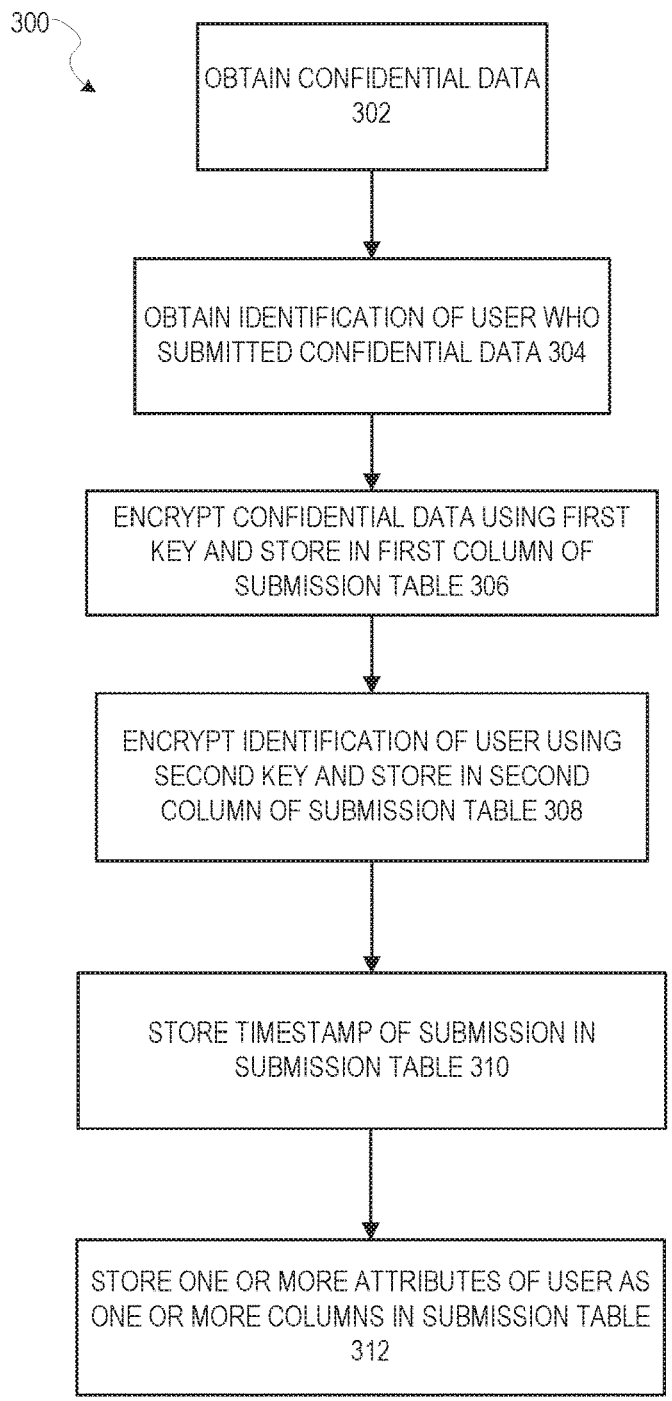
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, this method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302, 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third party service for the identification information for the user. Regardless, after operations 302 and 304 have been performed, the confidential data backend 106 now has at its disposal some confidential data and identification information for the user who entered the confidential data.

It should be noted that the confidential data may either be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for submission is stored. In a fourth column 408, a first attribute of the user, here location, is stored. In a fifth column 410, a second attribute of the user, her title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
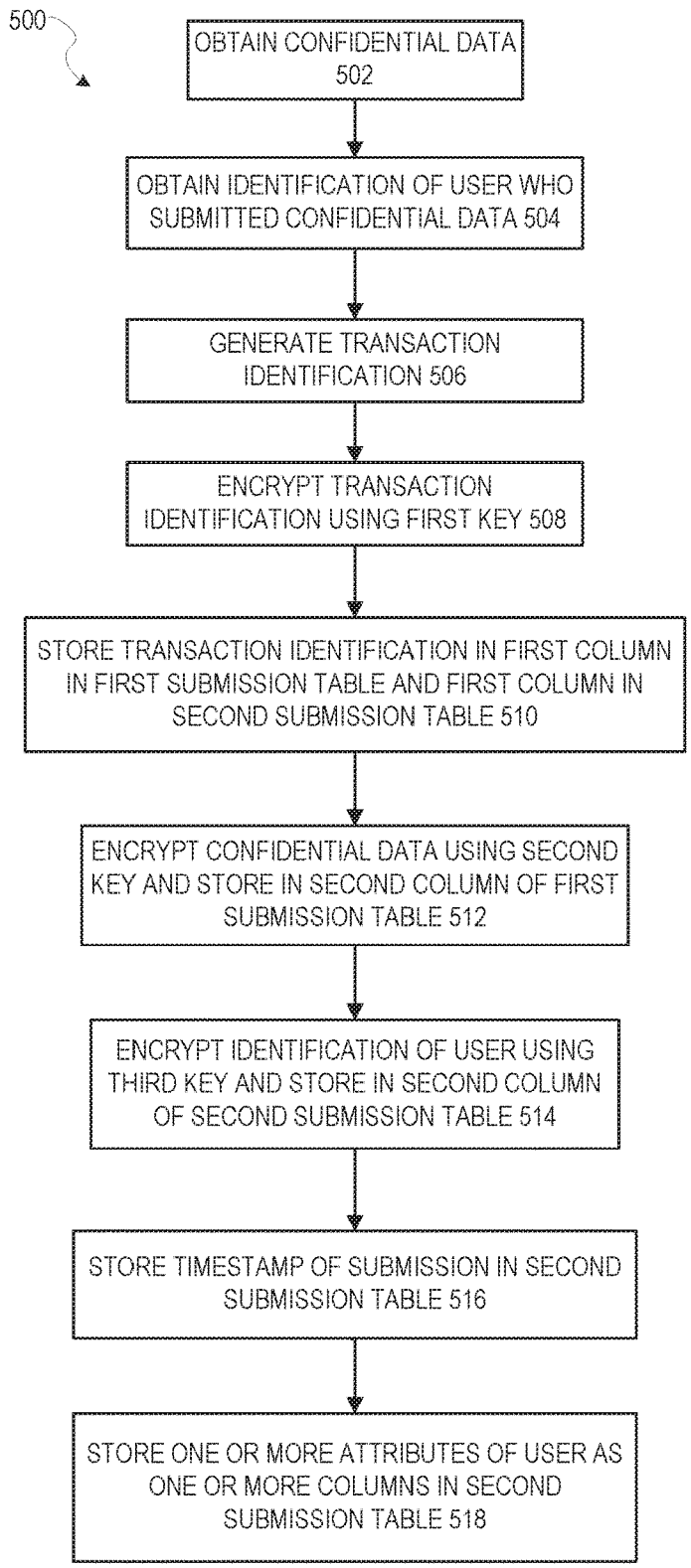
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user to which the confidential data applies is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining what to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

FIG. 6 is a diagram illustrating an example of a first submission table 600 and second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by a first key is stored. In a second column 610, identification of the user who submitted the corresponding confidential data, encrypted by a third key, is stored. In a third column 612, a timestamp for submission is stored. In a fourth column 614, a first attribute of the user (here location) is stored. In a fifth column 616, a second attribute of the user, her title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using a additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

Figure 7:
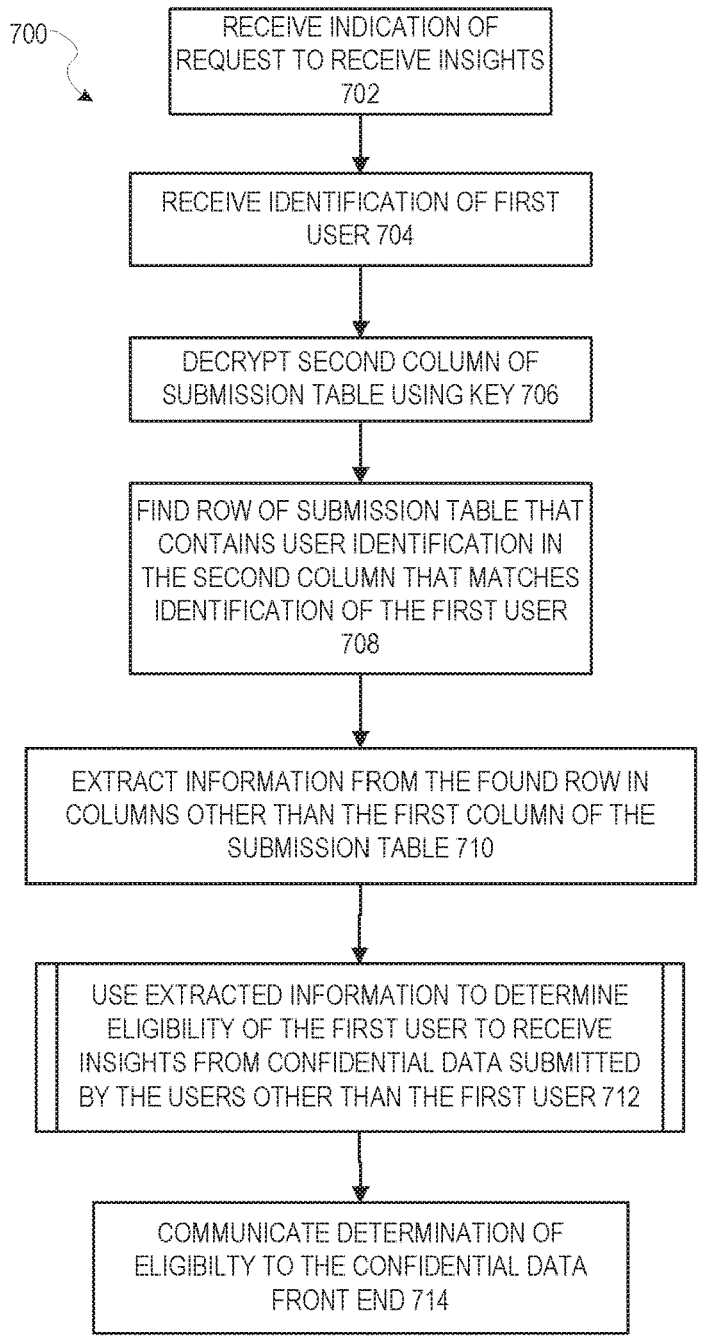
FIG. 7 is a flow diagram depicting a method for determining eligibility of a first user to receive insights about confidential data submitted by other users, in accordance with an example embodiment.

FIG. 7 is a flow diagram depicting a method 700 for determining eligibility of a first user to receive insights about confidential data submitted by other users, in accordance with an example embodiment. The method may be performed at, for example, the confidential data backend 106 of FIG. 1. At operation 702, an indication of a request to receive insights is received. This method 700 may also be performed in cases where there is a single submission table, such as described above with respect to FIGS. 3 and 4. The request may be received from, for example, the confidential data frontend 104 in response to a user action requesting insights. In some example embodiments, this request comes at or around the time that the first user submits his or her own confidential data; however, in other example embodiments, this request comes separately.

At operation 704, an identification of the first user is received. In some example embodiments, this identification may be received as part of the request received in operation 702.

At operation 706, a second column in the submission table may be decrypted using a key. This key may be related to the second key used to encrypt information in the second column in the submission table in FIG. 3, although it should be noted that "related to" does not necessarily mean "exactly the same as." For example, in some example embodiments, the encryption of the information in the second column in FIG. 3 may be performed using a public key portion of a public key-private key pair while the decryption of the information in the second column in FIG. 7 may be performed using a private key portion of the public key-private key pair. Public and private keys are beyond the scope of this present disclosure, but generally the keys in such pairs are related but not determinable from one another. The public key is generally available to anyone who wishes to encrypt the information but the private key to decrypt the encrypted information is only provided to entities that are authorized to decrypt the information.

At operation 708, a row in the submission table that contains a user identification in the second column that matches the identification of the first user is found. At operation 710, information from the found row in columns other than the first column of the submission table (the first column containing the submitted confidential data and encrypted using a different key than the user identification information) is extracted. At operation 712, this information in the found row from columns other than the first column is used to determine eligibility of the first user to receive insights from confidential data submitted by users other than the first user. At operation 714, the determination of eligibility is communicated to the confidential data front end 104, which then can either provide or not provide insights to the first user based on this determination of eligibility. Notably, FIG. 7 is performed without needing to decrypt the first column of the submission table, and potentially therefore without even having access to a key capable of decrypting the first column of the submission table. In other words, the computer process implementing the operations of FIG. 7 may be segregated from any process having access to the confidential data stored in the first column of the submission table, ensuring that should a malicious user gain access to the underlying abilities of the computer process implementing the operations of FIG. 7, such a user still would not be able to gain access to the confidential data itself.

The operations described above with respect to FIG. 7 could also be applied to embodiments where the identifications of users submitting confidential data are stored in separate tables than the confidential data itself, such as in the embodiments described above with respect to FIGS. 5 and 6. Rather than the operations in FIG. 7 being applied to a lone submission table, these operations would simply be applied to the second submission table, without even needing to access the first submission table. Additionally, should an encrypted transaction identification be used in linking the two submission tables, there would be no need for the computer process implementing the operations of FIG. 7 to perform a join on the two submission tables and thus no reason to even have access to a key capable of decrypting the transaction identifications in the submission tables (described as the first column in each of the first and second submission tables above with respect to FIGS. 4 and 5).

Figure 8:
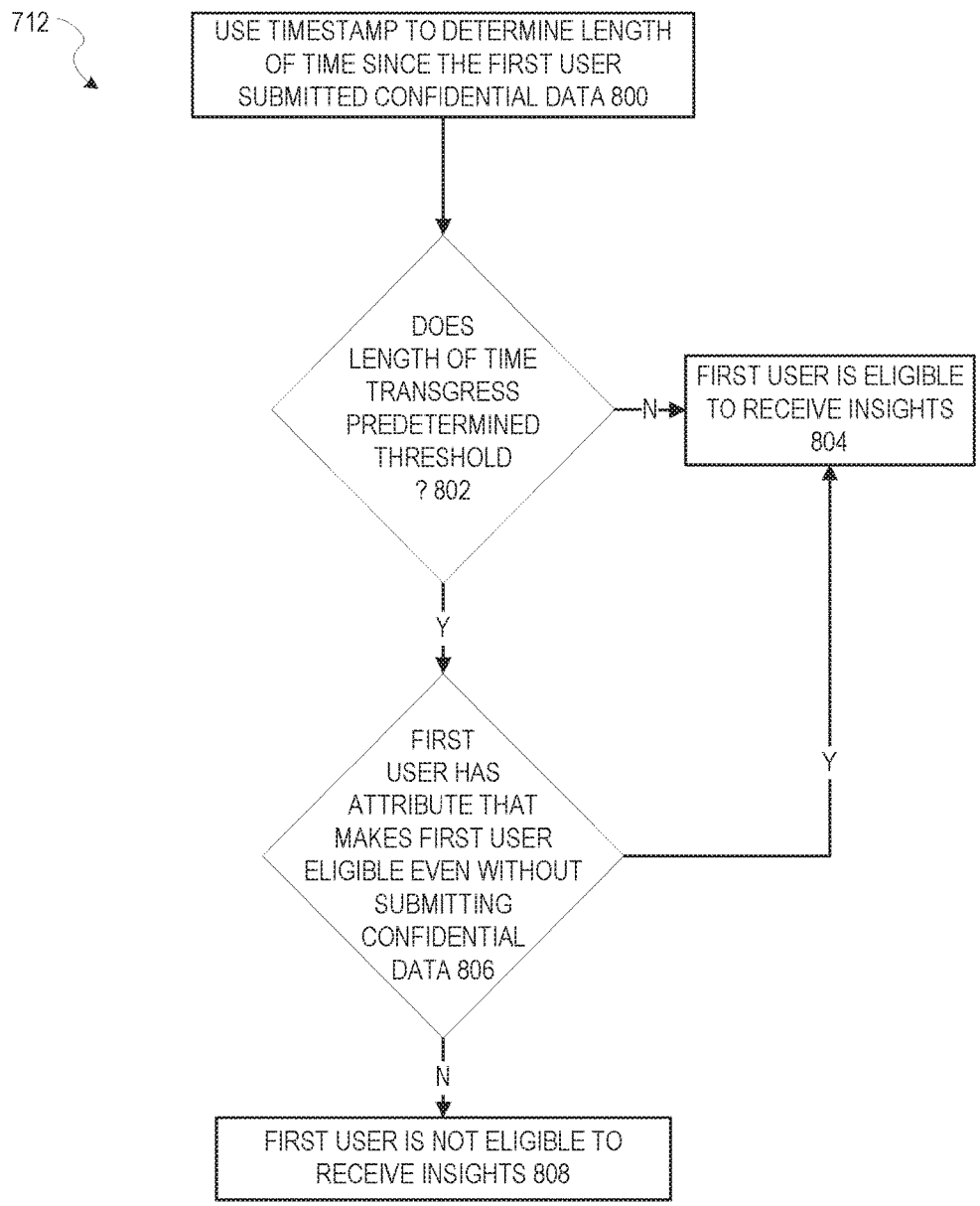
FIG. 8 is a flow diagram illustrating a method for determining eligibility of a first user to receive insights from compensation data from other users, in accordance with an example embodiment.

FIG. 8 is a flow diagram illustrating a method for determining eligibility of a first user to receive insights from compensation data from other users, in accordance with an example embodiment. In one example embodiment of FIG. 7, the method of FIG. 8 represents operation 712 of FIG. 7 in more detail.

At operation 800, a timestamp in the row in submission table (or in the second submission table in embodiments having multiple submission tables) is used to determine a length of time since the first user submitted confidential data. At operation 802, it is determined if this length of time transgresses a predetermined threshold. If it does not, then at operation 804 it is concluded that the first user is eligible to receive insights from confidential submitted by other users. If it does, however, then at operation 806 it is determined if the first user has an attribute that makes the first user eligible for receiving insights from confidential data submitted by other users even without having submitting confidential data of his or her own. These attributes may include, for example, profile based attributes (e.g., location, title, school, etc.), activity attributes (e.g., frequent user of the social networking service, about to transition from an active member to an inactive member, etc.), or transaction attributes (e.g., purchased a premium subscription). If so, then at operation 804 it is concluded that the first user is eligible to receive insights from confidential submitted by other users. If not, then at operation 808 it is concluded that the first user is not eligible to receive insights from confidential submitted by other users. These attributes may contain either primary attribute values (values taken directly from prior data, such as values contained in a member profile, e.g., education, skills, actual title, etc.), or derived attribute values (values inferred from values taken from prior data, e.g., gender, age, standardized title).

It should be noted that the derived attributes need not be derived by the component that creates or manages the submission table. In example embodiments, the primary attribute values may be obtained from a member service that returns primary member attribute values for an identified member, while the derived attribute values are obtained from standardization or other services. Referring back to FIG. 1, the databus listener 110 may utilize information received from the confidential data frontend 104 to query one or more services for attributes. One of these services may be member services 126, which may be queried using a member identification provided by the confidential data frontend 104 and return one or more attributes from a member profile in a social networking service. Another of these services may be a standardization service 128, which may receive an attribute value (either obtained directly from the confidential data frontend 104 or obtained from one of services 126, 128) and return a standardized version of that attribute. For example, the standardization service 128 may take an actual title as input and return a standardized version of that title. The actual title may have either been, for example, input by the user to the confidential data frontend 104, or retrieved as part of the member profile from the member services 126. A company details service (not pictured) may take a company identification or name as input and return details about that company for inclusion as derived attributes.

Other attributes may be added as part of an offline join between the submission table and other tables in other databases containing attributes. For example, member usage data such as how often a member interacts with a social networking service and how complete the member's profile is may be stored in offline databases that are not queryable in real time using, for example, an API. This type of attribute may be obtained using this offline mechanism in a batch mode.

Referring back to FIG. 7, once the confidential data frontend 104 receives the determination of eligibility is communicated from the confidential data backend 106, the confidential data frontend 104 may act in accordance with that determination of eligibility. For example, if the determination is that the first user is not eligible to receive insights from confidential data submitted by other users, then the confidential data frontend 104 may inform the first user via a user interface of the denial and/or provide reasons as to why the denial occurred (e.g., "it has been longer than 1 year since you submitted compensation information, please submit updated compensation information in order to view insights"). If the determination is that the first user is eligible to receive insights from confidential data submitted by other users, the confidential data frontend 104 may retrieve confidential data insights from the confidential data insights data store 122 via the confidential data relevance API 124 and display at least a portion of those insights to the first user.

It should be noted that FIGS. 7 and 8 merely represent example methodologies for determining eligibility of members to receive insights. There may be other approaches. For example, as will be described in more detail later, a machine learning approach may be combined with business rules (e.g., show insights to students or users from India), a set of eligible member identifiers could be precomputed and stored in a key-value store. At runtime, this key-value score could be queried to determine eligibility. In other words, there may be no need to decrypt or extract the relevant attributes or apply the model to compute eligibility at runtime.

In another example embodiment, the eligibility determination could still be performed at runtime, but by querying the relevant attributes from other APIs rather than decrypting from the submission table. A separate API could, for example, probe a separate table containing just the user identifiers that submitted compensation information, without any encryption.

Figure 9A:
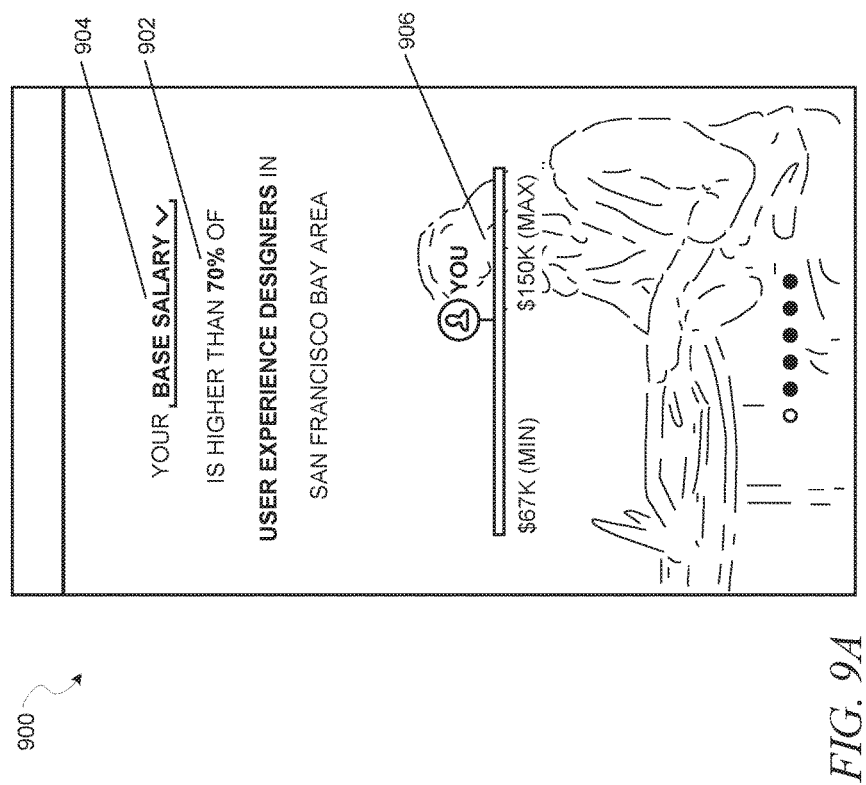
FIGS. 9A-9C are screen captures illustrating a user interface for displaying insights to a first user from confidential data submitted by other users, in accordance with an example embodiment.
Figure 9B:
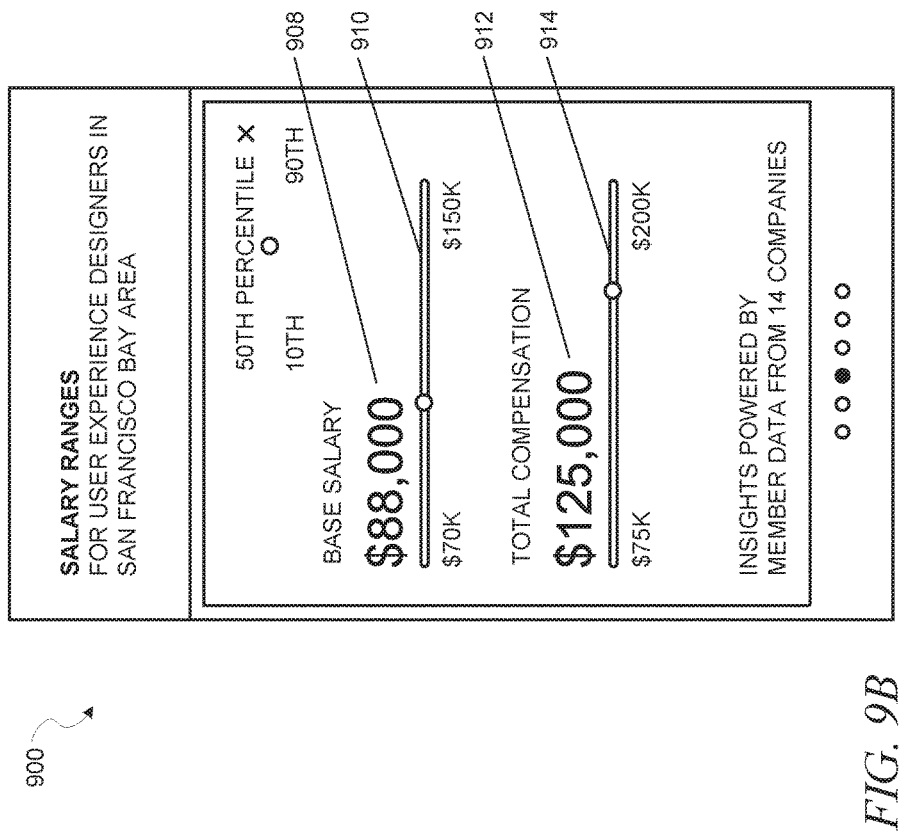
Figure 9C:
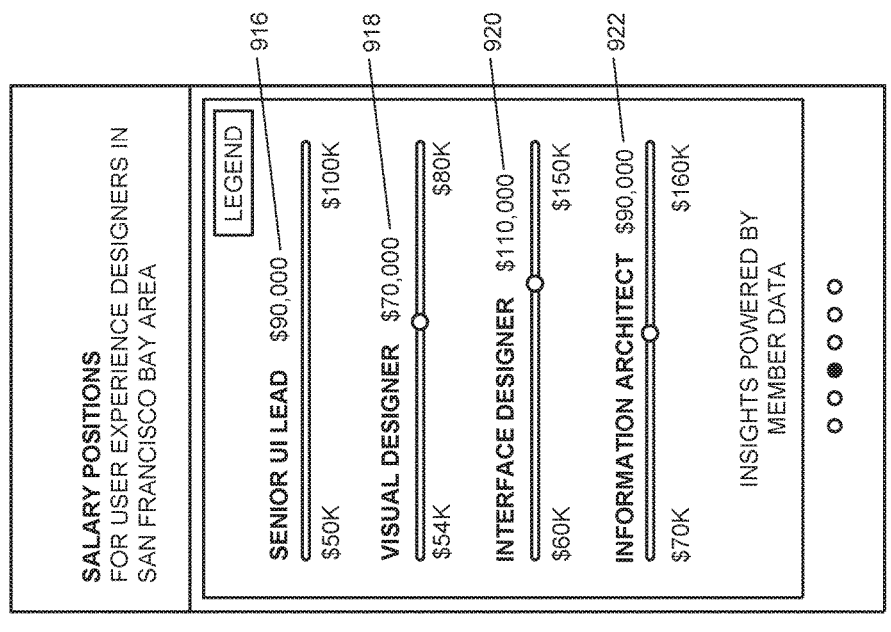

FIGS. 9A-9C are screen captures illustrating a user interface 900 for displaying insights to a first user from confidential data submitted by other users, in accordance with an example embodiment. Referring first to FIG. 9A, the user interface 900 displays a metric 902 comparing confidential data of the first user to other users in a same slice as the first user. Here, for example, the first user is able to see that his base salary (as selectable via drop-down menu 904) is higher than 70% of other users in the same slice (the slice being depicted as User Experience Designers in the San Francisco Bay Area). This metric is also displayed as a graphic 906 for easy comparison.

Referring now to FIG. 9B, the user interface 900 displays salary ranges for users in the same slice as the first user, including a median base salary 908, a range of submitted base salaries 910, median total compensation 912, and a range of submitted total compensations 914.

Referring now to FIG. 9C, the user interface 900 displays insights 916, 918, 920, and 922 for related positions to the position of the first user. Notably, these insights 916, 918, 920, and 922 may require using information from slices other than the one the first user belongs to. In an example embodiment, there is no limitation on the confidential data frontend 104 retrieving insights from the confidential data insights data store 122 that come from slices different than ones to which the user being presented with the data insights belongs, although in some example embodiments, the confidential data front end 104 may itself wish to limit the first user's ability to ask for and/or view certain types of information (e.g., the confidential data front end 104 may permit the first user to view salary information for positions related to the first user's own position, but not unrelated positions).

As depicted above, all of the insights may be statistical information derived from confidential data submitted by users other than the user viewing the insights (as well as potentially including the user's own confidential data as well).

As described briefly earlier, in an example embodiment, a machine learning algorithm may be used to train an engagement model to output an engagement score based on one or more features of the first user. This engagement model may be utilized in some example embodiments in operation 712 of FIG. 7 when determining the eligibility of a first user to receive insights from confidential data submitted by other users. The machine learning algorithm and engagement model will now be described in greater detail.

Figure 10:
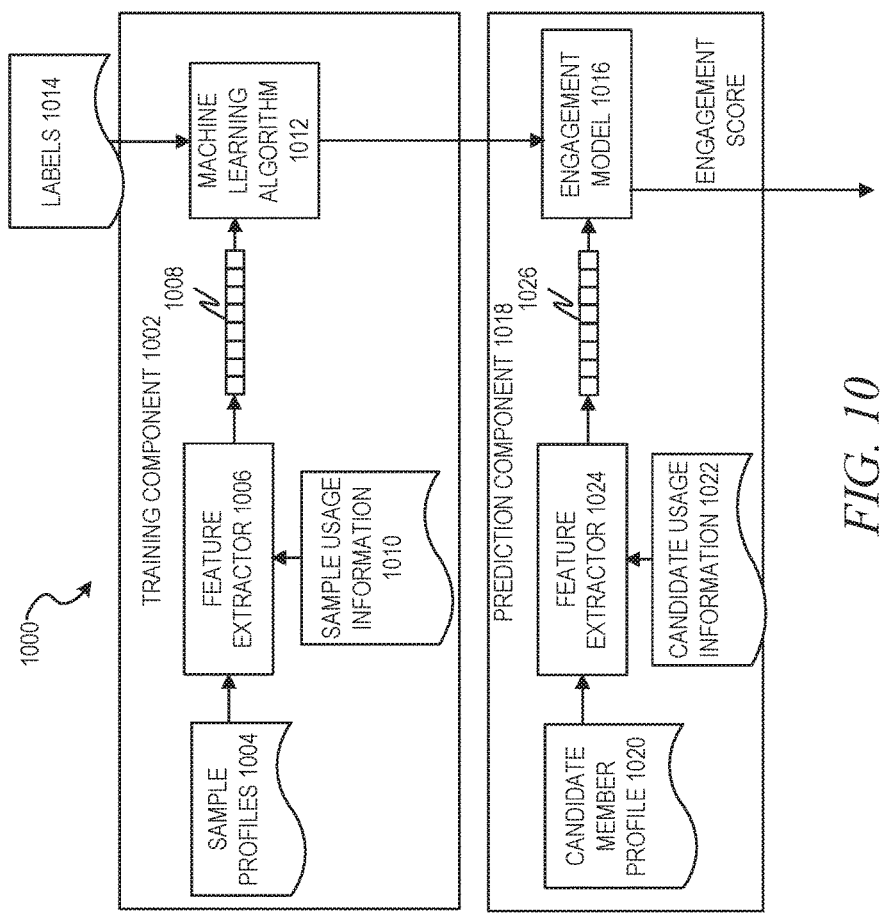
FIG. 10 is a block diagram illustrating an engagement machine learning algorithm component, in accordance with an example embodiment.

FIG. 10 is a block diagram illustrating an engagement machine learning algorithm component 1000, in accordance with an example embodiment. In some example embodiments, the engagement machine learning algorithm component 1000 may be located on the confidential data backend 106.

In a training component 1002, sample social networking member profiles 1004 are fed to a feature extractor 1006, which acts to extract curated features 1008 from the sample member profiles 1004. Sample usage information 1010, such as information about interactions each member corresponding to the sample member profiles 1004 had with the social networking service may also be used by the feature extractor 1006 to extract curated features 1008.

Thus, for example, the feature extractor 1006 may extract features such as profile attributes (e.g., title, location, school, etc.) from the sample member profiles 1004 and activity and/or transactional attributes (e.g., communications sent via the social networking service, page views on the social networking service, membership level on the social networking service, etc) from the usage information 1010. Extraction may be performed via a number of different extraction techniques. In a simple case, an element of a member profile data structure (such as member industry) or member usage information data structure (such as frequency of member profile update) can be pulled from the data structure to be fed to the machine learning algorithm without transformation. In other example embodiments, more complex transformations and/or pre-processing may be performed.

The curated features 1008 may be fed to a machine learning algorithm 1012 along with a label 1014 for each of the sample member profiles 1004. The label may represent an estimated engagement score for each member corresponding to the member profiles. The machine learning algorithm 1012 then trains an engagement model 1016 based on the curated features 1008 and labels 1014. The machine learning algorithm 1012 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors).

In a prediction component 1018, a candidate member profile 1020 and usage information 1022 are fed to a feature extractor 1024, which acts to extract curated features 1026 from the candidate records candidate member profile 1020 and usage information 1022. The curated features 1026 are then used as input to the trained engagement model 1016, which outputs an engagement score for the member corresponding to the candidate member profile 1020 and usage information 1022. This engagement score reflects a likelihood that providing insights to the member corresponding to the candidate member profile 1020 and usage information 1022 will cause the member to increase engagement with the social networking service.

The candidate member profile 1020 and usage information 1022 may correspond to the first user being evaluated at operation 712 of FIG. 7. As a result, the engagement score output by the trained engagement model 1016 may be used by an engagement score evaluator (not pictured) to output a decision as to whether or not the first user is eligible to receive insights from confidential data submitted by other users. This may include, for example, the engagement score evaluator 1024 comparing the engagement score for the first user to a predetermined threshold. It should be noted that this threshold need not be the same for all users. For example, users with certain attributes may have different thresholds than users with other attributes (e.g., users in India may have a lower threshold because it is more difficult to obtain confidential data from such users).

It should be noted that while the feature extractor 1006 and the feature extractor 1024 are depicted as separate components, they may be the same component in some example embodiments. Additionally, a large number of different types of features could be extracted using the feature extractors 1006 and 1024. Furthermore, while in an example embodiment the features extracted by feature extractor 1006 are the same as the features extracted by feature extractor 1024, in other example embodiments there may be differences in the features.

In an example embodiment, one or more additional security features may be implemented to further preserve the confidentiality of the confidential data as well as ensuring that malicious users are not able to tie confidential data to particular users.

As described above, different columns of the submission table may be encrypted using different keys, which adds a layer of security to the process. To further enhance this security, in an example embodiment, not only are these columns encrypted using separate keys, the processing of these columns is never performed at the same time. This helps prevent an attacker who gains access the function being performed on the columns from using that as an advantage to gain access to both columns.

Furthermore, each different key, in an example embodiment, may be stored in a different secure key store. That way if an attacker gains access to one keystore he or she will not gain access to the keys in the other keystore, thus preventing association of the confidential data to a particular user.

Furthermore, in embodiments where the keys are public key-private key pairs, the component performing encryption may be limited to having access only to the public key portion of the pair while the component performing decryption will have access to the privacy key portion of the pair, despite the fact that both of these components are in the same system. This helps reduce the chances that an attacker who has access to a single component can get all the keys necessary to link the confidential data to a particular user.

Figure 11:
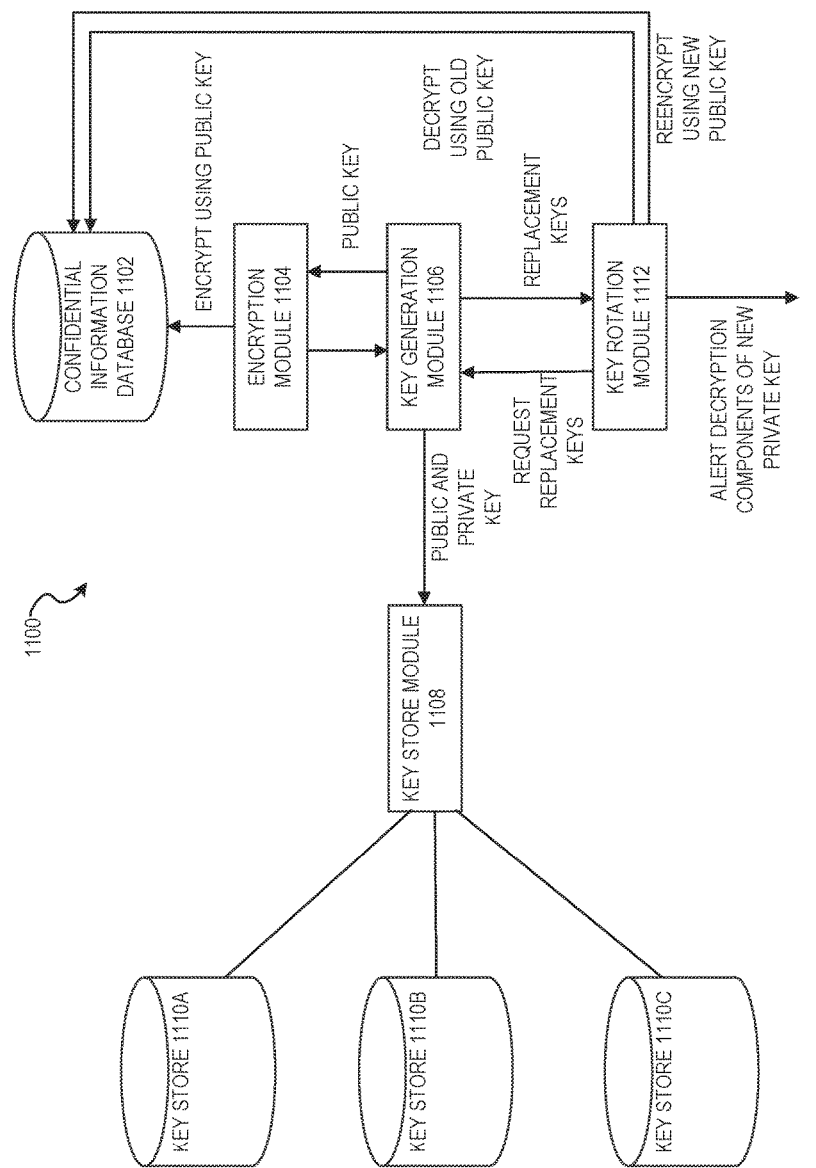
FIG. 11 is a block diagram illustrating a system for performing key rotation for keys encrypting one or more submission tables, in accordance with an example embodiment.

In another example embodiment, one or more of the keys are rotated. During this update, the data that was encrypted with the key being rotated is decrypted and encrypted with a new key, and the new key (or at least a key related to the new key) is sent out to any component that requests it to decrypt that data. FIG. 11 is a block diagram illustrating a system 1100 to performing key rotation for keys encrypting one or more submission tables, in accordance with an example embodiment. Here, the one or more submission tables are stored in a confidential information database 1102. In an example embodiment, the confidential information database 1102 may be confidential information database 108 and/or thresholds data store 116 of FIG. 1. An encryption module 1104 may act to encrypt data in the confidential information database 1102. As was described earlier, the data that may be encrypted can be the confidential data itself (e.g., salary information), an identification of a user submitting the confidential data, and/or attributes of the user submitting the confidential data, and each of these pieces of information may be encrypted using a different key (or pair of keys). For discussion purposes in regards to FIG. 11, it is assumed that the confidential data is encrypted using a first public key in a first public-private key pair, the identification of the user who submitted the confidential data is encrypted using a second public key in a second public-private key pair, and the attributes of the user who submitted the confidential data are encrypted using a third public key in a third public-private key pair. The encryption module 1104 may, for example, act directly upon the information in the submission table(s) in the confidential information database 1102 to encrypt the data.

When encryption is to be performed, the encryption module 1104 may request a public key for the data to be encrypted from a key generation module 1106. The key generation module 1106 may, for example, generate a public-private key pair for each type of data to be encrypted. The key generation module 1106 may then share the public key from the public-private key pair with the encryption module 1104. It should be noted that it is not necessary that the key generation generate a new public key each time the encryption module 1104 needs to encrypt a piece of data. If the data is of a type that a key pair was already generated for and it is not time for key rotation, the encryption module 1104 may simply reuse a previous public key for that data type. It should also be noted that the key generation module 1106 shares only the public key portion of each public-private key pair, and not the private key portion, with the encryption module 1104. Thus, an attacker who gains access to the encryption module 1104 is not able to actually decrypt the data that it encrypts.

While the key generation module 1106 generates the keys, a key store module 1108 actually arranges for storage of keys. As was described earlier, in an example embodiment, each type of key (or key pair) is stored in a different key store 1110A, 1110B, 1110C. The key store module 1108 may manage this storage process. Thus, for example, the key store module 1108 may store the first private key in first key store 1110A, the second private key in second key store 1110B, and the third private key in third key store 1110C (the first, second, and third public keys do not need to be kept private, and thus storage of these keys in the key stores 1110A, 1110B, 1110C is optional).

A key rotation module 1112 may maintain various timers and/or rules indicating when keys should be rotated. A key is rotated by decrypting any data encrypted using the key, generating a new replacement key, and encrypting the decrypted data using the new replacement key. Any components that used the old key (or portion of the shared key pair) to decrypt data may be alerted that their old key has expired, thus necessitating a new request to the key store module 1108 when desiring to decrypt the re-encrypted data.

In an example embodiment, the key rotation module 1112 is designed so that no key or key pair is rotated when another key or key pair is being rotated. This helps ensure that an attacker who gains access to the key rotation module 1112 itself would only, at best, gain access to a single key or key pair. Thus, for example, if the first private key is being rotated, the second private key will not be rotated during that time that the first private key is being rotated. It is permissible, however, for example, for the first public key to be rotated at the same time as the first private key because they are part of the same key pair (and, of course, because the first public key is not confidential and thus access to the first public key is not a threat to data security).

The design of the key rotation module 1112 to ensure that the above protections are in place may depend on how the key rotation mechanism is designed in the first place. In an example embodiment, each key or key pair combination used for decryption may be rotated on a periodic basis. In such embodiments, the periods for the rotations may be set such that there is no overlapping rotations performed at the same time. For example, different periods (expressed in days) could be selected for each key, and further, the rotations could be scheduled at different times (e.g., 4 am, 12 pm, 8 pm) during the day to minimize the likelihood of overlap. In addition, the periods could be chosen to be mutually coprime integers (integers chosen such that the greater common divisor is 1 for any pair, e.g., 6, 11, 13) to minimize the likelihood of the rotation being performed on the same day.

In other embodiments, keys or key pairs may be rotated on demand, such as, for example, when some threshold of security risk to the previous keys or key pairs is detected. For example, if a security breach is attempted on a first component that utilizes a first private key for decryption, the first private key may be immediately rotated, regardless of whether or not a particular period of time has passed since last rotation. A lock-out or other mechanism may be used to prevent any other key pair from being rotated while the first private key is being rotated.

When the key rotation module 1112 determines that it is time to rotate a particular key pair, the private key portion of the key pair is used to decrypt the data. The key rotation module 1112 requests that the key generation module 1106 generate a new public key-private key pair. The public key portion of the pair is used by the encryption module 1104 to reencrypt the decrypted data. The private key portion of the pair is sent to the key store module 1108 for storage in the appropriate key store 1110A, 1110B, 1110C. Each component that uses the private key for decryption may also be alerted that the previous key is out of date, thus indicating that the component should, when decryption is warranted, request the updated private key from the key store module 1108.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-11 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 12:
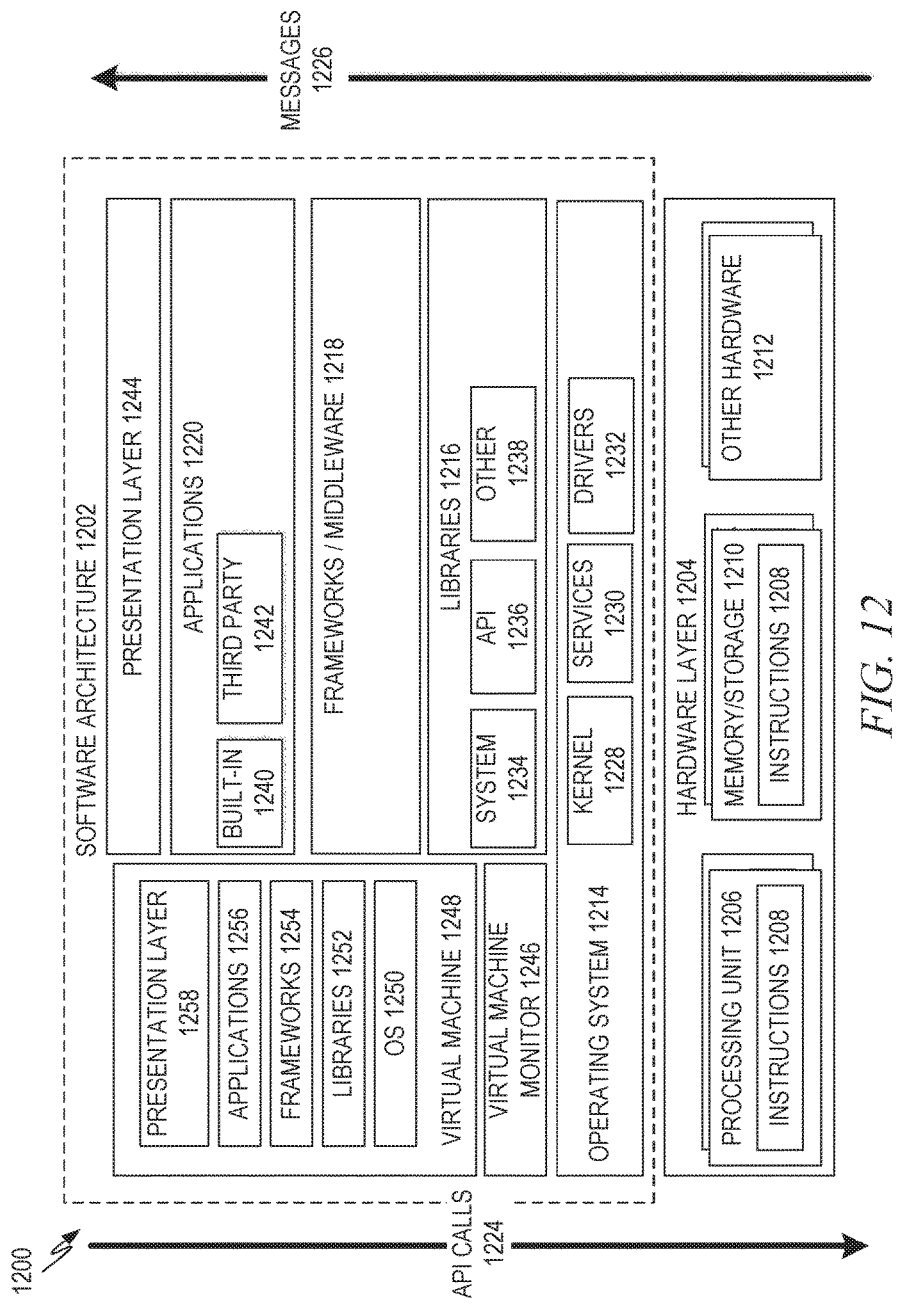
FIG. 12 is a block diagram illustrating a representative software architecture, which may be used in conjunction with various hardware architectures herein described.

FIG. 12 is a block diagram 1200 illustrating a representative software architecture 1202, which may be used in conjunction with various hardware architectures herein described. FIG. 12 is merely a non-limiting example of a software architecture, and it will be appreciated that many other architectures may be implemented to facilitate the functionality described herein. The software architecture 1202 may be executing on hardware such as a machine 1300 of FIG. 13 that includes, among other things, processors 1310, memory/storage 1330, and I/O components 1350. A representative hardware layer 1204 is illustrated and can represent, for example, the machine 1300 of FIG. 13. The representative hardware layer 1204 comprises one or more processing units 1206 having associated executable instructions 1208. The executable instructions 1208 represent the executable instructions of the software architecture 1202, including implementation of the methods, modules, and so forth of FIGS. 1-11. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive responses, returned values, and so forth, illustrated as messages 1226, in response to the API calls 1224. The layers illustrated are representative in nature and not all software architectures have all layers. For example, some mobile or special purpose operating systems may not provide a layer of frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematical functions, and the like. In addition, the libraries 1216 may include API libraries 1236 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third party applications 1242. Examples of representative built-in applications 1240 may include, but are not limited to, a contacts application, a browser application, a book reader application, a location application, a media application, a messaging application, and/or a game application. The third party applications 1242 may include any of the built-in applications 1240 as well as a broad assortment of other applications. In a specific example, the third party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1242 may invoke the API calls 1224 provided by the mobile operating system such as the operating system 1214 to facilitate functionality described herein.

The applications 1220 may utilize built-in operating system 1214 functions (e.g., kernel 1228, services 1230, and/or drivers 1232), libraries 1216 (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Figure 13:
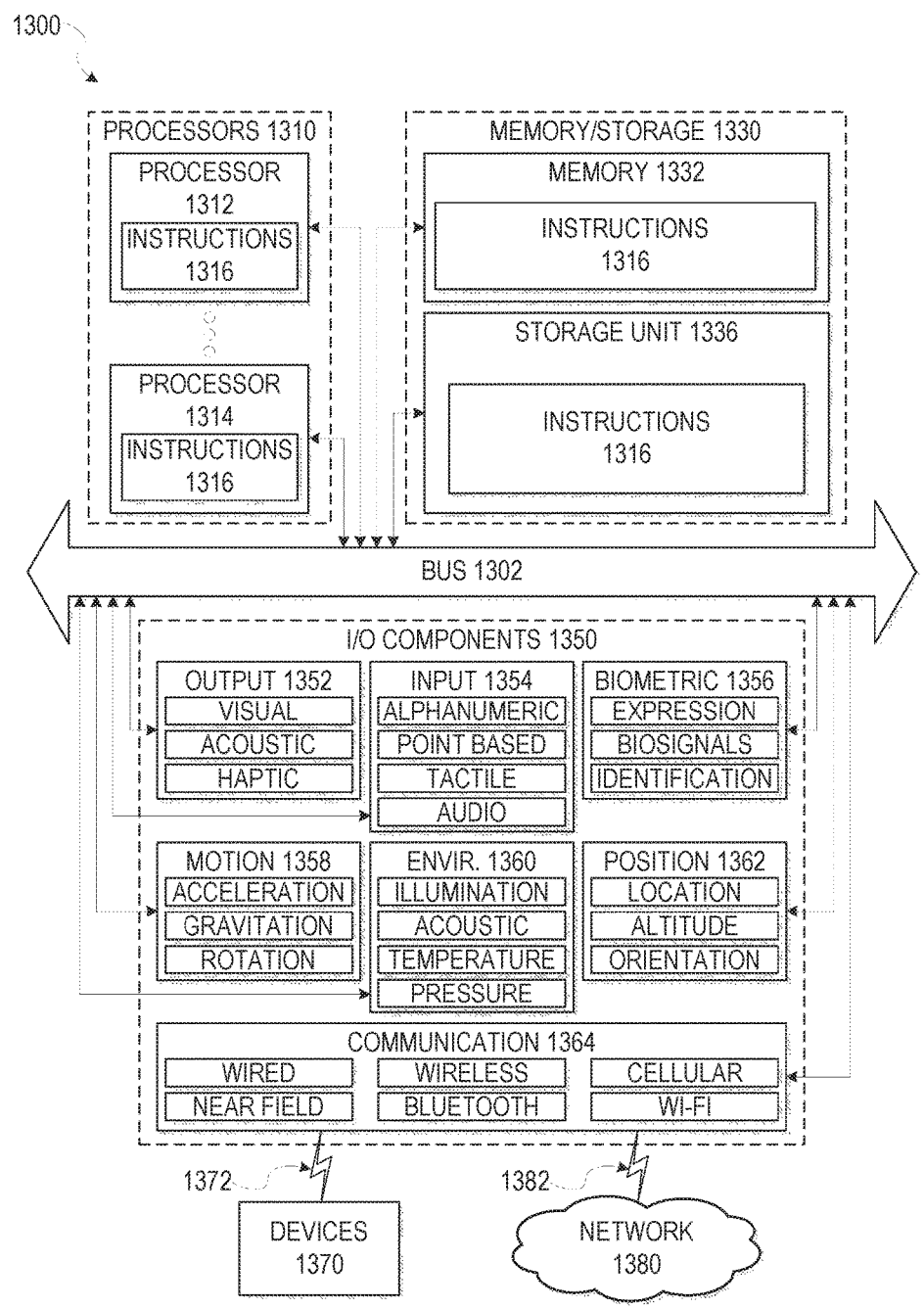
FIG. 13 is a block diagram illustrating components of a machine, according to some example embodiments, able to read instructions from a machine-readable medium (e.g., a machine-readable storage medium) and perform any one or more of the methodologies discussed herein.

Some software architectures utilize virtual machines. In the example of FIG. 12, this is illustrated by a virtual machine 1248. A virtual machine creates a software environment where applications/modules can execute as if they were executing on a hardware machine (such as the machine 1300 of FIG. 13, for example). A virtual machine is hosted by a host operating system (e.g., operating system 1214 in FIG. 12) and typically, although not always, has a virtual machine monitor 1246, which manages the operation of the virtual machine 1248 as well as the interface with the host operating system (e.g., operating system 1214). A software architecture executes within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different. Example Machine Architecture and Machine-Readable Medium FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine (e.g., processors 1310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., HTTP). Similarly, the instructions 1316 may be transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
   receiving, via a first computerized user interface, a submission of confidential data from a user;
   obtaining an identification of the user;
   using the identification of the user to query a first service to obtain a member profile corresponding to the user in a social networking service;
   identifying one or more primary attribute values from the member profile;
   using one of the primary attribute values to query a second service to obtain a derived attribute value corresponding to the one or more primary attribute values;
   storing the confidential data, one or more of the primary attribute values, and the derived attribute value in a first submission table in a confidential information database;
   using the one or more of the primary attribute values and the derived attribute value to classify the user into one or more slices, each slice corresponding to a grouping of users sharing one or more attributes; and
   retrieving the confidential data and storing it in one or more extraction, transformation, and loading (ETL) tables in the confidential information database.

2. The method of claim 1, further comprising:
   storing the identification of the user in the first submission table, wherein the ETL table does not store the identification of the user.

3. The method of claim 1, further comprising:
   storing the identification of the user in a second submission table, wherein the ETL table does not store the identification of the user.

4. The method of claim 1, wherein the second service is a standardization service.

5. The method of claim 1, wherein the first and second services are queried via Application Program Interfaces (APIs).

6. The method of claim 1, wherein the primary and derived attribute values are encrypted using a first key prior to being stored in the first submission table and the confidential data is encrypted using a second key prior to being stored in the first submission table, wherein the first key is different than the second key.

7. The method of claim 1, wherein each ETL table corresponds to a different slice.

8. A system comprising:
a computer-readable medium having instructions stored there on, which, when executed by a processor, cause the system to:
receive, via a first computerized user interface, a submission of confidential data from a user;
obtain an identification of the user;
use the identification of the user to query a first service to obtain a member profile corresponding to the user in a social networking service;
identify one or more primary attribute values from the member profile;
use one of the primary attribute values to query a second service to obtain a derived attribute value corresponding to the one or more primary attribute values;
store the confidential data, one or more of the primary attribute values, and the derived attribute value in a first submission table in a confidential information database;
use the one or more of the primary attribute values and the derived attribute value to classify the user into one or more slices, each slice corresponding to a grouping of users sharing one or more attributes; and
retrieve the confidential data and storing it in one or more extraction, transformation, and loading (ETL) tables in the confidential information database.

9. The system of claim 8, wherein the instructions further cause the system to:
store the identification of the user in the first submission table, wherein the ETL table does not store the identification of the user.

10. The system of claim 8, wherein the instructions further cause the system to:
store the identification of the user in a second submission table, wherein the ETL table does not store the identification of the user.

11. The system of claim 8, wherein the second service is a standardization service.

12. The system of claim 8, wherein the first and second services are queried via Application Program Interfaces (APIs).

13. The system of claim 8, wherein the primary and derived attribute values are encrypted using a first key prior to being stored in the first submission table and the confidential data is encrypted using a second key prior to being stored in the first submission table, wherein the first key is different than the second key.

14. The system of claim 8, wherein each ETL table corresponds to a different slice.

15. A non-transitory machine-readable storage medium comprising instructions, which when implemented by one or more machines, cause the one or more machines to perform operations comprising:
receiving, via a first computerized user interface, a submission of confidential data from a user;
obtaining an identification of the user;
using the identification of the user to query a first service to obtain a member profile corresponding to the user in a social networking service;
identifying one or more primary attribute values from the member profile;
using one of the primary attribute values to query a second service to obtain a derived attribute value corresponding to the one or more primary attribute values;
storing the confidential data, one or more of the primary attribute values, and the derived attribute value in a first submission table in a confidential information database;
using the one or more of the primary attribute values and the derived attribute value to classify the user into one or more slices, each slice corresponding to a grouping of users sharing one or more attributes; and
retrieving the confidential data and storing it in one or more extraction, transformation, and loading (ETL) tables in the confidential information database.

16. The non-transitory machine-readable storage medium of claim 15, wherein the instructions further comprise:
storing the identification of the user in the first submission table, wherein the ETL table does not store the identification of the user.

17. The non-transitory machine-readable storage medium of claim 16, wherein the instructions further comprise:
storing the identification of the user in a second submission table, wherein the ETL table does not store the identification of the user.

18. The non-transitory machine-readable storage medium of claim 15, wherein the second service is a standardization service.

19. The non-transitory machine-readable storage medium of claim 15, wherein the first and second services are queried via Application Program Interfaces (APIs).

20. The non-transitory machine-readable storage medium of claim 15, wherein the primary and derived attribute values are encrypted using a first key prior to being stored in the first submission table and the confidential data is encrypted using a second key prior to being stored in the first submission table, wherein the first key is different than the second key.

* * * * *